United States Patent
Rukletsov et al.

(10) Patent No.: US 12,141,053 B2
(45) Date of Patent: Nov. 12, 2024

(54) RELIABLE AUTOMATIC ESTIMATION OF TEST FLAKINESS

(71) Applicant: Red Hat, Inc., Raleigh, NC (US)

(72) Inventors: Alexander Rukletsov, Grasbrunn (DE); Benjamin Bannier, Hamburg (DE)

(73) Assignee: Red Hat, Inc., Raleigh, NC (US)

( * ) Notice: Subject to any disclaimer, the term of this patent is extended or adjusted under 35 U.S.C. 154(b) by 170 days.

(21) Appl. No.: 17/992,799

(22) Filed: Nov. 22, 2022

(65) Prior Publication Data
US 2024/0168867 A1    May 23, 2024

(51) Int. Cl.
*G06F 11/36* (2006.01)
*G06F 11/07* (2006.01)

(52) U.S. Cl.
CPC ........ *G06F 11/3688* (2013.01); *G06F 11/076* (2013.01); *G06F 11/3692* (2013.01)

(58) Field of Classification Search
CPC ............... G06F 11/3688; G06F 11/076; G06F 11/3692; G06F 2201/81; G06F 11/008
See application file for complete search history.

(56) References Cited

U.S. PATENT DOCUMENTS

| | | | |
|---|---|---|---|
| 10,235,277 B2 | 3/2019 | Herzig et al. | |
| 10,733,084 B2 | 8/2020 | Krasko | |
| 10,831,647 B2 | 11/2020 | Tailor et al. | |
| 2019/0243753 A1* | 8/2019 | Zhang | G06F 11/3664 |
| 2019/0294531 A1 | 9/2019 | Avisror et al. | |
| 2020/0183821 A1 | 6/2020 | Qin et al. | |

OTHER PUBLICATIONS

Karan Nair et al.; Modeling and Ranking Flaky Tests at Apple; IEEE; pp. 110-119; retrieved on Mar. 1, 2024 (Year: 2020).*
Maxime Cordy et al.; FlakiMe: Laboratory-Controlled Test Flakiness Impact Assessment. A Case Study on Mutation Testing and Automated Program Repair; arxiv.org; 11 pages; retrieved on Mar. 1, 202 (Year: 2019).*
Habchi et al., "What Made This Test Flake? Pinpointing Classes Responsible for Test Flakiness", arXiv:2207.10143v1 [cs.SE] (Jul. 20, 2022), 12 pages, https://doi.org/10.48550/arXiv.2207.10143.
Li et al., "Evolution-Aware Detection of Order-Dependent Flaky Tests", In Proceedings of the 31st ACM SIGSOFT International Symposium on Software Testing and Analysis (ISSTA '22), Jul. 18-22, 2022, Virtual, South Korea. ACM, New York, NY, USA, 12 pages. https://doi.org/10.1145/3533767.3534404.
Micco, John. "Flaky Tests at Google and How we Mitigate Them", Google Testing Blog, May 27, 2016, 2 pages, https://testing.googleblog.com/2016/05/flaky-tests-at-google-and-how-we.html.
Ziftci et al., "De-Flake Your Tests : Automatically Locating Root Causes of Flaky Tests in Code At Google," 2020 EEE International Conference on Software Maintenance and Evolution (ICSME), 2020, pp. 736-745, doi: 10.1109/ICSME46990.2020.00083.

* cited by examiner

*Primary Examiner* — S. Sough
*Assistant Examiner* — Cuong V Luu
(74) *Attorney, Agent, or Firm* — Womble Bond Dickinson (US) LLP

(57) ABSTRACT

A test flakiness system retrieves, from a repository, a software test and a software module. The test flakiness system performs the flakiness test against the software module, determining a flakiness value for the software test. On a condition that a difference between the flakiness value and a set of historical flakiness values exceeds a threshold, the test flakiness system creates a defect record.

17 Claims, 6 Drawing Sheets

300

Table 1

RELIABLE AUTOMATIC ESTIMATION OF TEST FLAKINESS

TECHNICAL FIELD

Aspects of the present disclosure relate to software testing, and more particularly, to determining problems introduced by code changes that can be identified by an increase in tests' flakiness.

BACKGROUND

Software development can involve large, complex applications. Release of these applications can involve continuous testing of the application code. Changes to the code base can introduce defects into the applications. Changes to supporting infrastructure can also introduce problems into an application system. Tests performed against application systems can sometimes fail for reasons other than code defects. Continuous testing attempts to detect issues as quickly as possible by running tests upon a change in the software code. Many tests can be automated.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

FIG. 3 is an example table illustrating the recording of test flakiness over time, in accordance with some embodiments of the disclosure.

DETAILED DESCRIPTION

Figure 1:
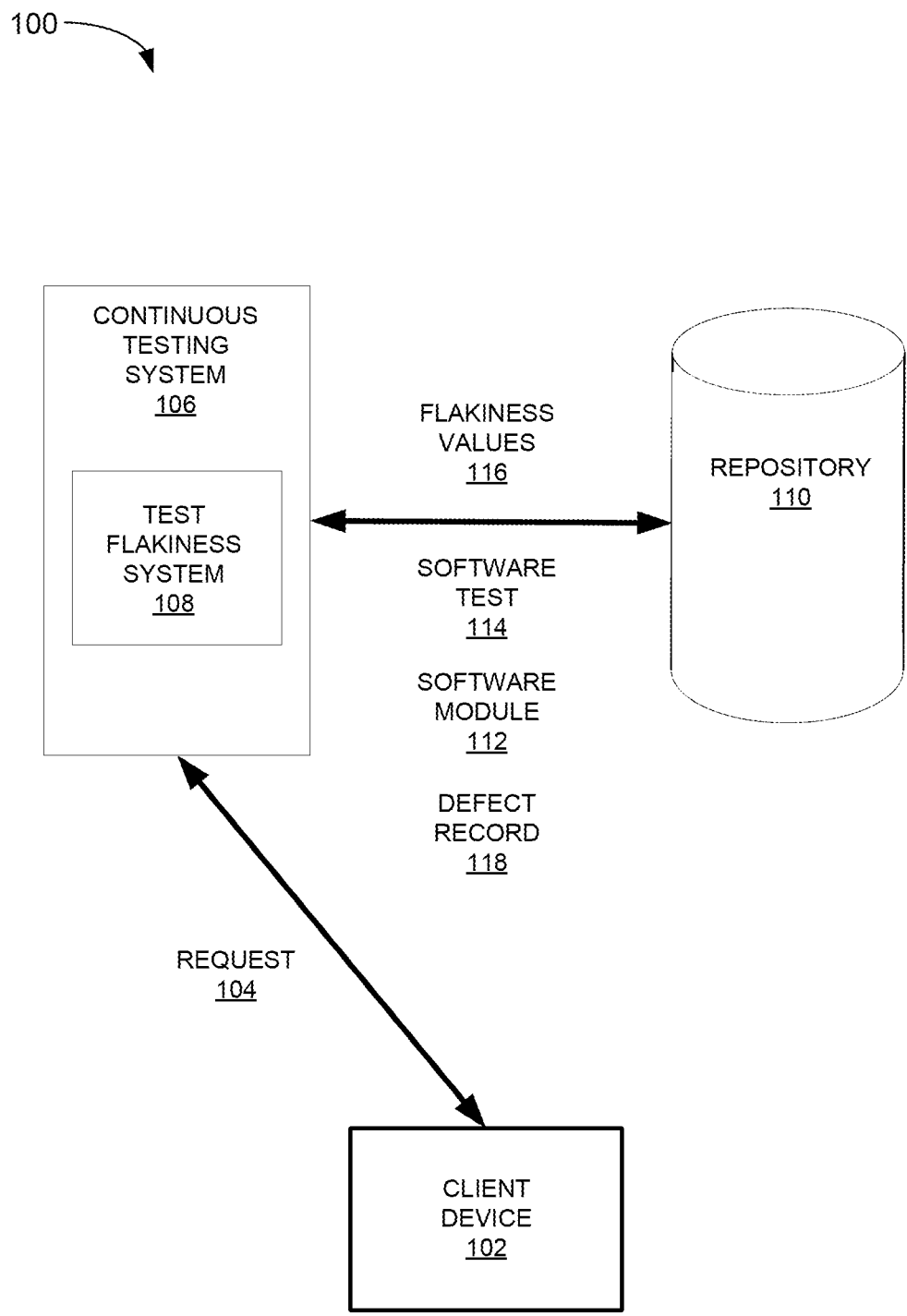
FIG. 1 is an illustrative example of a flakiness testing architecture, in accordance with some embodiments of the disclosure.

A flaky test is a test for which a result is non-deterministic, e.g., in software, a test that can both pass and fail without any changes to the underlying code. Put another way, a flaky test sometimes fails, but if retried enough times, it passes. Alternatively, a flaky test usually passes, but if retried enough times, it fails. Such tests can be problematic because they can mask newly introduced coding errors that can be difficult to identify for subsequent investigation. As a codebase and its number of tests increases, flaky tests can be likely, especially for end-to-end tests involving both software and hardware components. However, some defects that are introduced by code changes and masked by flaky tests can be identified. Different strategies can be applied against flaky tests. First, one can run a flaky test several times and declare success if it passes at least once and failure if all runs fail. Another strategy is to completely ignore flaky tests' results. Yet another strategy is to segregate flaky tests in their own test suite until (and if) they demonstrate deterministic behavior.

Some tests can be complex and involve many prerequisites and dependencies. However, a test failure is not always indicative that the function under test has a defect. For example, tests involving networking can fail because of network issues. Alternatively, software tests can fail because of a real problem in the software, but because the test doesn't consistently indicate that something is wrong, rather occurring every now and then, the source of the problem can be hard to identify. One can suspect that the fault lies with infrastructure or with some other dependency upon which the function relies, when the problem actually lies with the software.

This phenomenon can be more relevant for some types of software than for others. For example, software using the cloud can rely on replicated communication paths that can lead to race conditions. For example, if multiple entities talk to one another, over different communication paths, those entities should not depend on a particular message delivery order. Otherwise, a function may usually work—but sometimes fail—depending on how the network decides to deliver specific messages. Such a test can be referred to as a "flaky" test. Sometimes it succeeds and sometimes it fails. However, the test can still provide value.

Absent a test flakiness system, a developer likely gets a notification that a test has failed. However, after investigation, the developer may conclude that the failing test is not due to a code change. The developer retries the test and it succeeds. However, one-time success of a flaky test does not guarantee future success. An increase in a flaky test's failure from 10 failures in 1000 test executions to 30 failures in 1000 test executions represents a 300% increase in failures. A human, however, likely discerns no difference in a "mostly succeeds" test result.

Flaky tests are likely an unavoidable reality for test sets at a large scale. Flaky tests can compromise a fragile balance of workflow and quality. Bugs can hide under the disguise of a flaky test, e.g., a test loses its purpose if the developer just ignores the failure due to its flaky nature. Flaky tests also take up valuable resources when running them and increase execution cost. Ultimately, flaky tests can reduce continuous testing/integration stability, increase time-to-market, reduce developer trust, and impact developer experience.

Flaky tests can be expensive to repair, particularly if a developer has become inured to a test failure and the root cause of the flakiness manifests itself in a production environment and results in a customer's outage or impaired operations. An assumption can often be made that failure of a flaky test doesn't indicate a real bug—it's just a flaky test. Another issue can be a poorly written test itself, that manifests itself as a false alert and distraction to the development team.

Aspects of the present disclosure address the above-noted and other deficiencies by providing a flakiness testing system. The testing system monitors a measure of flakiness and pinpoints changes (commits) to a codebase that may have affected flakiness. Benefits of the embodiments of the present disclosure for a flakiness testing system include first determining a flakiness value for each of a set of software tests and then monitoring the results of these software tests over time for any increase in flakiness. Such monitoring can improve software and system quality by identifying potential issues which, while significant, are too infrequent to be identified by a human. Such monitoring further allows engineers to investigate not only software code, but supporting infrastructure, for defects and/or impediments.

A flakiness test system, as part of an automated testing system, can also provide automated creation of defect records and other types of submissions to defect (or bug) tracking systems. Automated testing allows software tests and other sets of repeatable tasks to be performed without human interaction. Furthermore, these tests can run with varying frequency to ensure that an application continuously performs as expected. Problems frequently occur whenever the source code is updated. A benefit of automated testing is that it can increase accuracy. Indeed, automated testing is less likely to be affected by human error. Incorporating flakiness testing into an automated testing system can be beneficial when dealing with a large codebase or when new features are added. In addition, automated testing helps ensure that errors or defects in the code are identified and fixed as quickly as possible. Extending automated testing to include flakiness testing can improve testing coverage of software as well as extend the bounds of the testing beyond the application and to other servers and components in the application environment, e.g., networking elements.

Automated testing can also lead to reduced costs. When tests are automated, the need for manual testers is reduced. In addition, the time needed to execute tests is reduced, leading to savings in terms of both time and money.

Moreover, automated flakiness tests can help reduce the cost of software development by detecting errors earlier in the process and allowing them to be fixed. They can also help reduce the cost of supporting an application, as automated tests can require less time to identify defects. This is particularly relevant to defects identified by flaky tests, as correlating a defect that may manifest itself in less than one percent of tests with a change to an application or other element in the cloud can consume large amounts of time to identify, let alone correct. If automated flakiness tests are incorporated into a continuous testing system, the tests can be configured to automatically execute each time a new feature or change is introduced into the application or application infrastructure. This can help ensure that any issues in the recent changes are identified as quickly as possible so that they can be fixed as quickly as possible.

Automated flakiness testing can help to improve collaboration between developers and infrastructure engineers. By incorporating tests focused on flaky behavior, both developers and information technology engineers can rely on them during the implementation of new changes or features as well as the roll-out of new hardware and hosts. This can improve coordination between different members of a team in identifying and resolving issues.

As discussed in greater detail below, a flakiness testing system may include a collection of servers that provide one or more services to one or more client devices. The flakiness testing system may retrieve, from a repository, a software test and a software module. The flakiness testing system may then perform the software test against the software module. The flakiness testing system may then determine a flakiness value for the software test and compare that flakiness value with a set of historical flakiness values. If the difference between the flakiness value and the historical flakiness values exceeds a threshold, the flakiness testing system may create a defect record in a bug tracking system.

Although aspects of the disclosure may be described in the context of continuous testing, embodiments of the disclosure may be applied to any computing system that performs testing and evaluates the results of the tests.

FIG. 1 is an illustrative example of a flakiness testing architecture 100, in accordance with some embodiments of the disclosure. However, other flakiness testing architectures 100 are possible, and the implementation of a computer system utilizing examples of the disclosure are not necessarily limited to the specific architecture depicted by FIG. 1. As shown in FIG. 1, continuous testing system 106 includes a test flakiness system 108. In some embodiments, the test flakiness system receives a request 104 from a client device 102 to perform a software test against a software module. In some embodiments, the test flakiness system determines that a new version of an application is available for testing. In some embodiments, a continuous testing system 106 determines that a new version of a software module 112 is available. In some embodiments, flaky tests are run periodically against a software application and supporting infrastructure to identify defects or other issues that may have been introduced by changes to a cloud infrastructure.

Upon such a determination, the test flakiness system 108 can retrieve a software module 112 and a software test 114 from a repository 110. In some embodiments, the repository 110 can be a code control system or a version control system. In some embodiments, the repository can be part of a continuous testing system.

In some embodiments, the test flakiness system 108 applies the software test 114 against the software module 112. In some embodiments, the test flakiness system 108 may repeat the software test 114 a number of times in order to obtain a flakiness value for the software test.

In some embodiments, the test flakiness system 108 is part of a continuous testing system, such as continuous testing system 106. In some embodiments, any change to a software module results in a full build of an application and execution of an entire suite of tests. In some embodiments, a test can be applied against a single module, for a single element of functionality, e.g., a unit test. In some embodiments, tests are periodically run across an entire application and assessed for an increase in flakiness that exceeds a threshold.

In an embodiment, the test flakiness system 108 compares the current flakiness value of the test to historical flakiness values 116. In some embodiments, if the difference between the current flakiness value and the historical flakiness values 116 exceeds a threshold, a defect record 118 is created and stored in the repository. In some embodiments, the defect record may be added to a defect, or bug, tracking system. In some embodiments, a trouble ticket may be added to an infrastructure maintenance system to solicit information on infrastructure changes, such as network changes or host updates, that may contribute to an increase in flakiness of a test. In some cases, simply alerting stakeholders that "something" changed on a particular date, perhaps at a particular time, can cause the question, "could that increase be due to the new software we installed on our network switches," to be more deeply considered. Adding the defect to a bug tracking system allows it to be triaged against other competing demands.

In some embodiments, p can be defined to be a measure of a test's flakiness before some change C, and p' (p-prime) to be the measure of that test's flakiness after the change. At least four scenarios can be contemplated.

In a first scenario, a test has a low measure of flakiness, e.g., $p<0.001$, before a change C, and the test's flakiness increases only slightly after the change C, e.g., $|p'-p|<0.001$. Such cases can be hard to detect using simple statistical methods.

In a second scenario, no test failures are observed before a code change C (which does not mean the test is not flaky), but after the change, the test fails once. Formally, this may be indistinguishable from the first scenario, but can be easy to detect and may not require special treatment.

In a third scenario, a test's flakiness p is already large before a change C, e.g., p>0.1. In this scenario a small change can be much harder to detect because as C→0, (|p'−p|/p')→0. In layman's terms, the flakier the test, the more the test can mask any new failures associated with a change.

In a fourth scenario, a test has a measure p of flakiness, and after a change C, its flakiness p' increases such that, for example, |p'−p|»0.001. In some embodiments such cases can be identified and associated with underlying changes to code or to an environment in which the code executes.

Some embodiments use an automated test system that performs builds, as part of which the test system runs a collection of individual tests. Then, in some embodiments, for each test, during each build, the test system can record the success or failure of a test. In some embodiments, the test system can periodically, e.g., every N days, calculate the value of p', an estimate of flakiness for the test.

Figure 2:
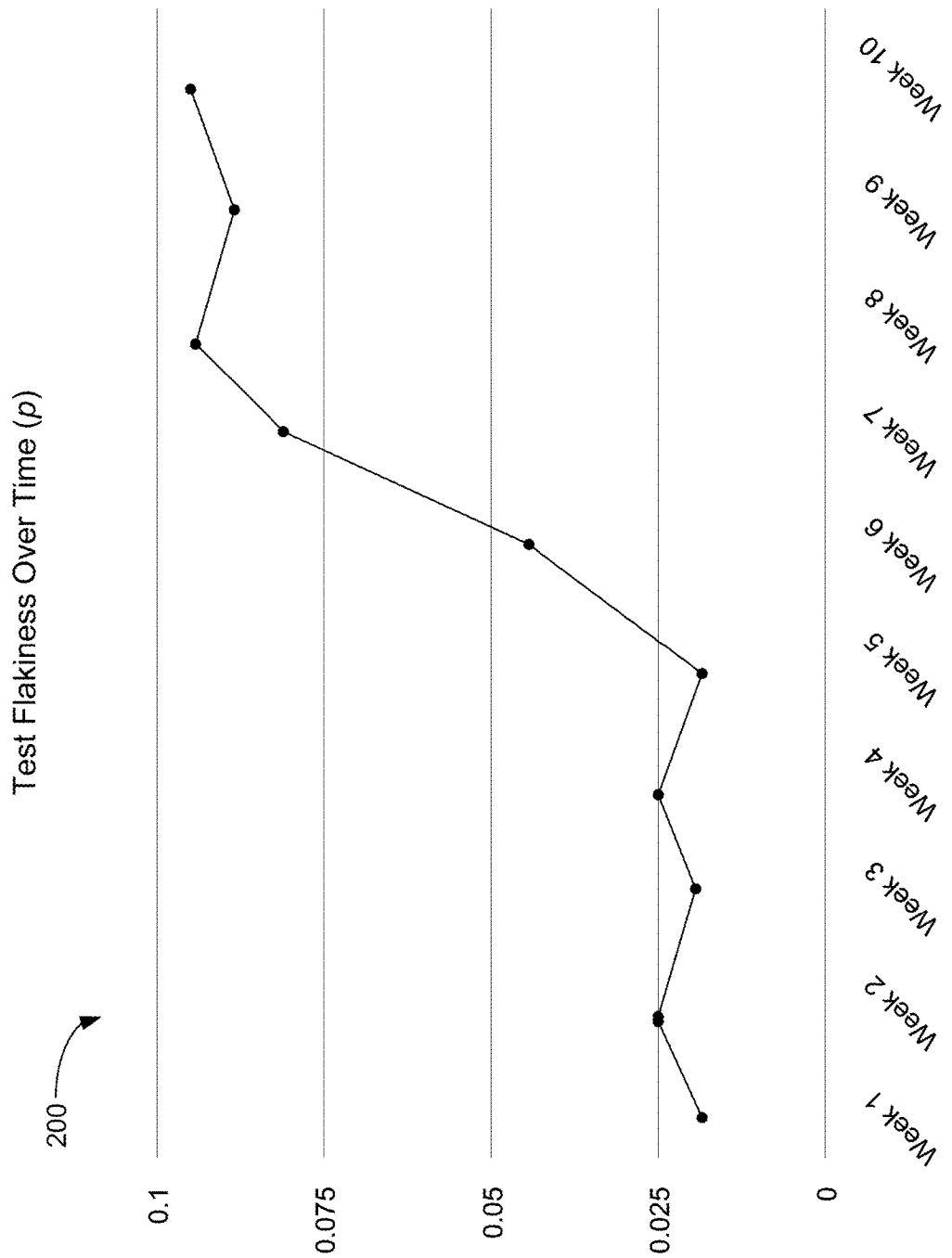
FIG. 2 is a graph of an illustrative example of test flakiness over time, in accordance with some embodiments of the disclosure.

FIG. 2 is a graph 200 of an illustrative example of test flakiness over time, in accordance with some embodiments of the disclosure.

In an embodiment, graph 200 shows the execution of a test executed weekly over a period of ten weeks. The graph 200 indicates a flakiness value (p) for the test of approximately 0.025 through week five. While the flakiness is slightly below 0.025 for weeks one, three, and five, the test results indicate that the flakiness is relatively stable.

However, commencing with week six, the flakiness of the test increases by approximately 0.075, in increments of 0.025 per week, reaching almost 0.1 at week 8. While the measure of change in flakiness for weeks nine and ten approximates that of weeks two and three, the flakiness has almost quadrupled since week five. An examination of the graph suggests that, in some embodiments, changes occurred to the system under test during weeks six, seven, and eight that significantly increased the flakiness of the test. While the test may not unequivocally indicate a code defect, engineers can examine any changes applied to the code base in weeks six, seven, and eight, as well as any changes that may have been made to the system's infrastructure. Notably, the change from 0.025 to 0.1 would likely be undetectable to a human observer yet is statistically significant.

To calculate p', a measure of test flakiness, i.e., the probability of a test's failure, an experiment can be performed every N days. Perform n iterations of a test observing v failures and calculate $p'_n=v/n$, then perform the test an additional m times, checking the convergence criterion, e.g., $|p'_n-p'_{n+m}|\varepsilon$. The goal of the convergence criterion is that, as a sequence progresses, the probability of an "unusual" outcome becomes smaller and smaller. Continue until the convergence criterion is met. In some embodiments, in order to detect small values of p', more repetitions of tests can be performed.

In some embodiments, an objective is to perform an experiment until the change in the number of failures converges to zero. For example, if a test is performed twice and fails once, one explanation is that p is 0.5 (a 50% failure rate). A more likely explanation, for a flaky test, is that an insufficient number of samples have been taken. Alternatively, the test can be executed 100 times, followed by an additional 50 executions, and see if the estimates based on 100 iterations and 50 iterations differ more than some epsilon (F), where epsilon is the mean distance between the iterations expressed in terms of a number of standard deviations.

In some embodiments, an alternative convergence criterion can be derived using error propagation. Error propagation is the effect of variables' uncertainties (or errors, and more specifically random errors) on the uncertainty of a function based on them. When the variables are the values of experimental measurements, they have uncertainties due to measurement limitations, e.g., instrument precision, which can propagate due to the combination of variables in the function.

The uncertainty u can be expressed in a number of ways. It may be defined by the absolute error Δx. Uncertainties can also be defined by a relative error (Δx)/x, which is often written as a percentage. The uncertainty on a quantity can also be quantified in terms of the standard deviation, a, which is the positive square root of the variance. The value of a quantity and its error can then be expressed as an interval x±u. If the statistical probability distribution of the variable is known or can be assumed, confidence limits can be derived to describe the region within which the true value of the variable may be found. For example, the 68% confidence limits for a one-dimensional variable belonging to a normal distribution are approximately ±one standard deviation a from the central value x, which means that the region x±σ will cover the true value in roughly 68% of cases. In some embodiments, the probability can be calculated using v/n, the standard deviation, and a measure of uncertainty is $\sigma_p^2=(v^2/n)((\sigma_v/v)^2(\sigma n/n)^2$, with a stopping criterion $\sigma_p^2<\varepsilon$.

In some embodiments, an estimate of flakiness p can be calculated every N days, and the results stored. For each test, a probability of the observed test flakiness obeying p' can be calculated and any new detectable flakiness that may have been introduced since the last calculation of p' can be identified.

In some embodiments, using the terminology of statistical hypothesis testing, a null hypothesis Ho asserts that no new detectable flakiness is introduced after p'; an alternative hypothesis HA is that the test flakiness p' changed to p'' at some later point in time.

A t-test is a statistical test that is used to compare the means of two groups. It is often used in hypothesis testing to determine whether a process or treatment actually has an effect on the population of interest, or whether two groups are different from one another. Student's t-test is a method of testing hypotheses about the mean of a small sample drawn from a normally distributed population when the population standard deviation is unknown. In some embodiments, Student's t-test can be used to determine whether two sets of data, e.g., model and observation, are significantly different from each other. In some embodiments, one can assume that both p and p' are distributed normally with an unknown (and equal) variance. In such embodiments, the null hypothesis holds that the means are equal, e.g., HØ: μ(p)=μ(p'). In some embodiments, the t-test uses the t-statistic (where t-statistic is abbreviated from "hypothesis test statistic"): $T=(\mu(p')-(p))/(\sigma(p')/\sqrt{n})$ where σ(p') is an estimate of the standard deviation and n is the number of samples, i.e., test runs. In some cases, T follows a t-distribution with n−1 degrees of freedom and can be reasonably approximated by the standard normal distribution N(0,1) when n>10. With the significance level chosen at α=5%, this yields an acceptance criterion for the null hypothesis of: $-z.025<T<Z.025 \Rightarrow -1.96<T<1.96$, where a negative value specifies reduced flakiness. A high rate of type II errors, when n is small, can be a disadvantage of the t-test. A type II error is a statistical term used within the context of hypothesis testing that describes an error that occurs when one fails to reject a null hypothesis that is actually false. A type II error produces a false negative, also known as an error of omission. In some embodiments, deeming flakiness as unchanged when it actually has changed can constitute a type II error. Often, there can be a trade-off between a cost of running a large number of tests, e.g., a large number for n, and the resulting flakiness indicators.

A trade-off can exist regarding a frequency of comparing observations with a recorded p. If the comparison is too infrequent, a change in test flakiness may go undetected for an unacceptable amount of time, during which time customers are impacted and support organizations are attempting to respond to issues. In some embodiments, multiple comparison windows may be employed. For example, a test flakiness value may be compared with historical values of the last 5, 10, or 30 days.

Figure 3:
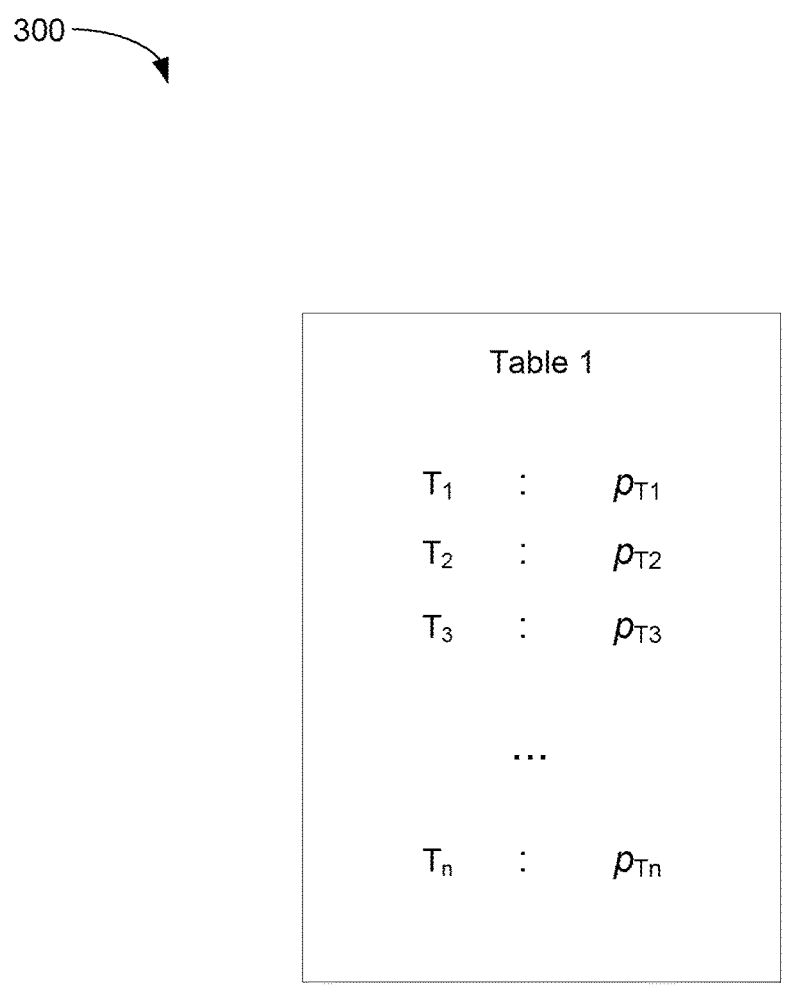

FIG. 3 is an example table 300 illustrating the recording of test flakiness over time, in accordance with some embodiments of the disclosure. The example table, "Table 1," includes historical flakiness values pTn associated with a test T. In some embodiments, the example table is similar to the flakiness values 116 of FIG. 1. In the example, the test recorded a flakiness value of pT1 at time $T_1$, and a flakiness value of pT2 at time $T_2$. In some embodiments, these historical flakiness values can be compared with a current flakiness value to indicate whether some change has statistically changed the amount of flakiness associated with the test.

Figure 4:
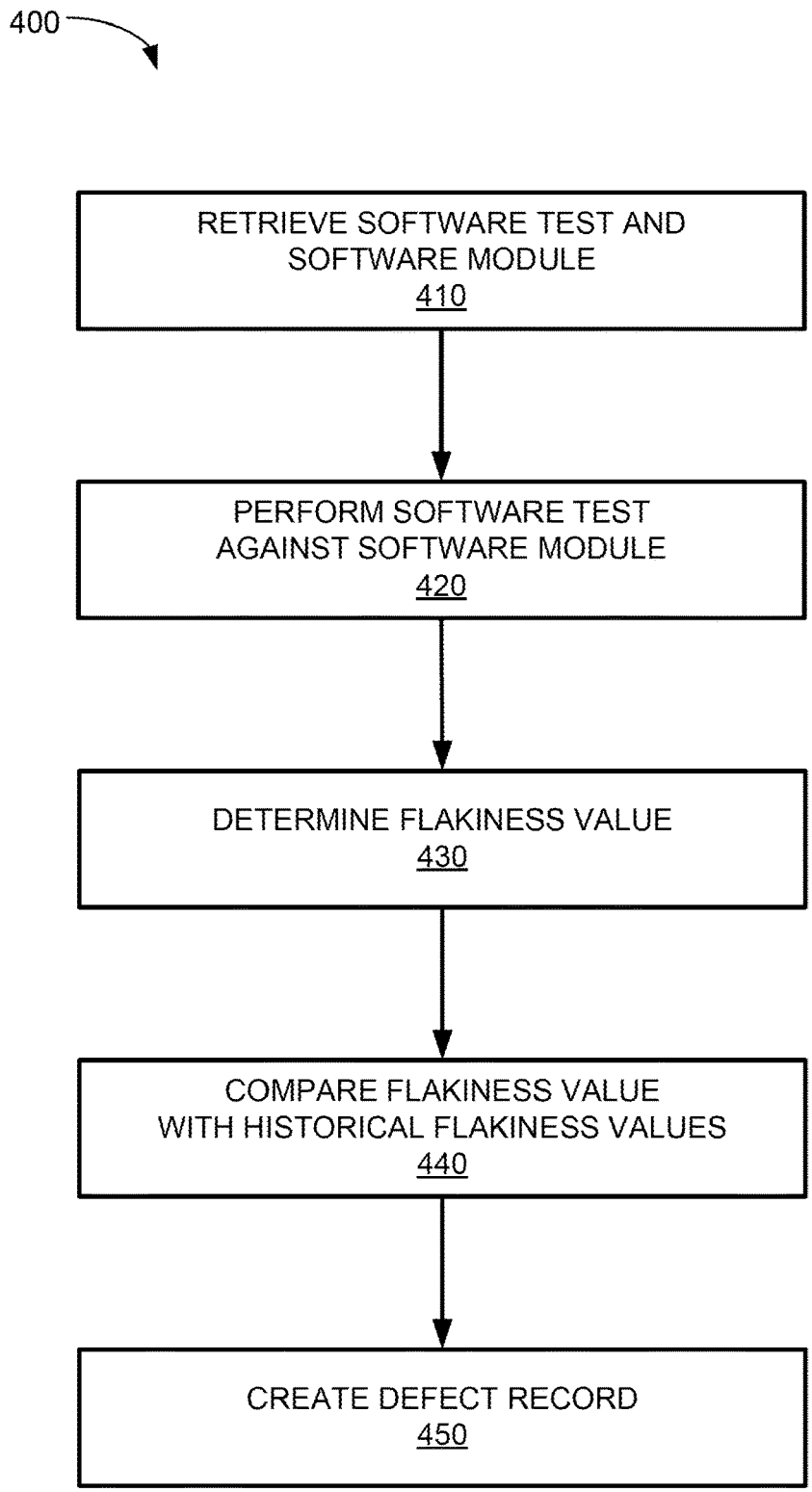
FIG. 4 is a flow diagram of an example method of determining test flakiness, in accordance with some embodiments of the disclosure.

FIG. 4 is a flow diagram of an example method 400 of determining test flakiness, in accordance with some embodiments of the disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by continuous testing system 106 of FIG. 1.

With reference to FIG. 4, method 400 illustrates example functions used by various embodiments. Although specific function blocks ("blocks") are disclosed in method 400, such blocks are examples. That is, examples are well suited to performing various other blocks or variations of the blocks recited in method 400. It is appreciated that the blocks in method 400 may be performed in an order different than presented, and that not all of the blocks in method 400 may be performed.

Method 400 begins at block 410, where the processing logic causes the test flakiness system to retrieve a software test and a software module. In some embodiments, the processing logic may cause the test flakiness system to retrieve multiple software tests to be run in combination against one or more software modules. In some embodiments, the software test or tests and the software module or modules may be stored in a test repository. In some embodiments, the test repository may be similar to the repository 110 in FIG. 1. In some embodiments, the retrieval of the software test and the software module may be obtained as a result of a continuous testing system receiving a notification that a change has been made to one or more software modules of a software application. In some embodiments, a request may come from a client device such as client device 102 in FIG. 1. In some embodiments, the continuous testing system 106 may actively monitor an execution environment of a development pipeline to determine that a new release of an application is ready for testing. In some embodiments, the test flakiness system 108 may monitor tests determined to be flaky.

At block 420, the processing logic performs the software test against the software module. In some embodiments the software test is repeated multiple times. In some embodiments multiple runs of a test are performed. In some embodiments, a first series of executions of the test is performed. In some embodiments, a second series of executions of the test is performed and the results compared with the first series of executions to determine if the two series of test executions converge. In some embodiments, the frequency of testing is between 5 and 30 days. In some embodiments, the testing may be performed daily. In some embodiments, testing may be performed upon a change to a software module. In some embodiments, testing may be performed based on a combination of time and software changes. In some embodiments, an occurrence of other events may influence testing.

At block 430, the processing logic determines a flakiness value for the software test. In some embodiments, the flakiness value can be a success rate for multiple occurrences of the software test. For example, if a test is performed twice and fails once, one explanation is that the test is experiencing a 50% failure, or flakiness, rate. However, if an additional 1000 executions of the test are all successful, the flakiness rate drops to 0.0999% or 0.000999.

At block 440, the processing logic compares the flakiness value with historical flakiness values. In some embodiments, the historical flakiness values are for the same software test and the same software module. In an embodiment, if the historical flakiness value of a test is 2% and the current flakiness value is 2%, even though the test occasionally fails, the frequency of failure has remained rather stable. However, should the flakiness value rise to 5%, representing a more than $2\lambda$ increase in failures, engineering resources may be alerted to the change and assigned to investigate.

At block 450, if the current flakiness value exceeds the value of the historical flakiness values for a particular test, the processing logic creates a defect record. In some embodiments, creation of a defect record is dependent on a difference between the flakiness value and the historical flakiness values exceeding a threshold. In some embodiments, a notification of the creation of a defect record is sent to a client device. In some embodiments, the notification may be part of a report generated by the test flakiness system. In some embodiments, a current flakiness value exceeding the value of the historical flakiness values for a particular test may result in a rollback of a software change. In some embodiments, In some embodiments, processing logic updates the historical flakiness values. In some embodiments, this update is recorded in a set of historical flakiness values associated with a software test and a software module. In some embodiments, this set of historical flakiness values is updated after every set of test executions. In some embodiments, this record may be similar to the table of FIG. 3.

Figure 5:
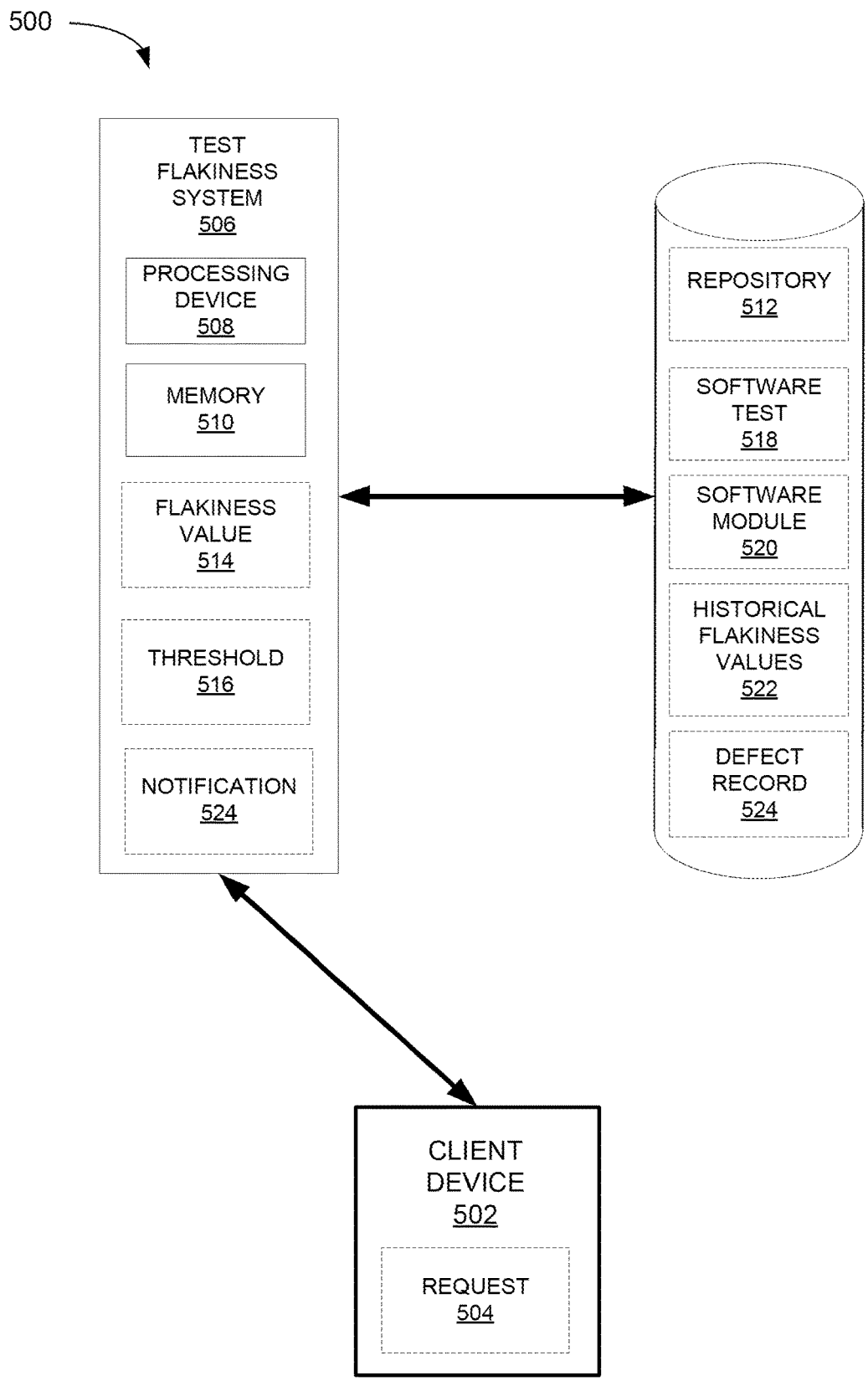
FIG. 5 is a block diagram depicting an example environment for a test flakiness architecture, in accordance with some embodiments of the disclosure.

FIG. 5 is a block diagram depicting an example environment 500 for a test flakiness architecture, in accordance with some embodiments. The environment 500 includes test flakiness system 506. Test flakiness system 506, which may correspond to test flakiness system 106 of FIG. 1, contains processing device 508 and memory 510. Example environment 500 also includes client device 502, which may correspond to client device 102 of FIG. 1. Example environment 500 also includes repository 508, which contains software test 516, software module 518, and historical flakiness values 520. Repository 508 may correspond to repository 110 of FIG. 1. Test flakiness system 506 further includes flakiness value 512 and threshold 514. It should be noted that request 504, flakiness value 514, threshold 516, software test 518, software module 520, historical flakiness values 522, and defect record 524 are shown for illustrative purposes only and are not physical components of test flakiness system 506.

The processing device 508 of test flakiness system 506 receives one or more requests 504. The processing device 508 retrieves a software test 516 and a software module 518 from the repository 508. The processing device 508 performs the software test 516. The processing device 508 determines a flakiness value 514 for the software test 516. The processing device 508 compares the flakiness value 514 with a set of historical flakiness values 522. The processing device 508 updates the set of historical flakiness values 522. On a condition that a difference between the flakiness value 514 and the set of historical flakiness values 522 exceeds a threshold 516, the processing device 508 creates a defect record 524.

Figure 6:
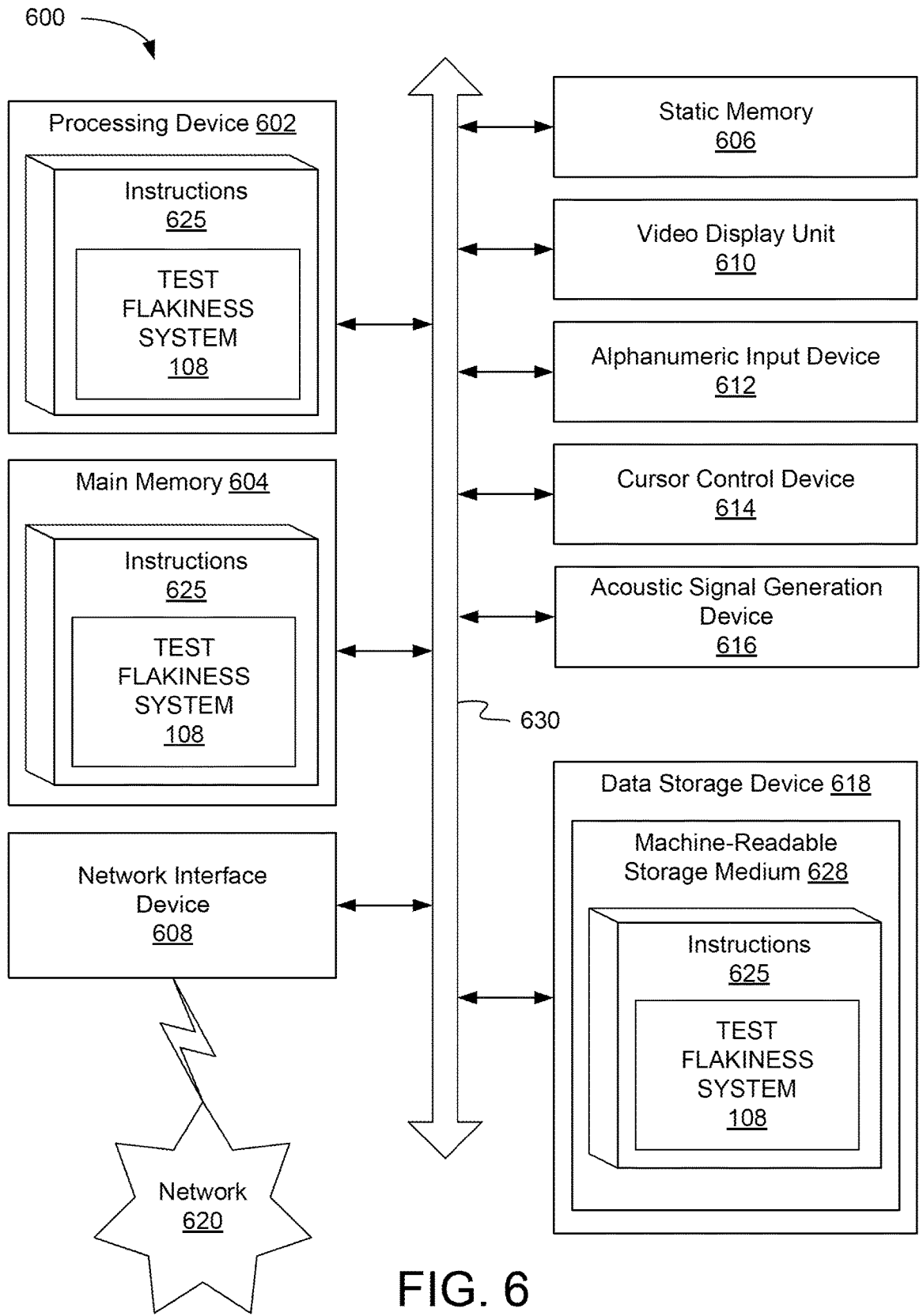
FIG. 6 is a block diagram of an example computing device that may perform one or more of the operations described herein, in accordance with some embodiments of the disclosure.

FIG. 6 is a block diagram of an example computing device 600 that may perform one or more of the operations described herein, in accordance with some embodiments of the disclosure. Computing device 600 may be connected to other computing devices in a LAN, an intranet, an extranet, and/or the Internet. The computing device may operate in the capacity of a server machine in a client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device 602, e.g., a general-purpose processor, a programmable logic device (PLD), a main memory 604, e.g., synchronous dynamic random-access memory (DRAM), read-only memory (ROM), static memory 606, e.g., flash memory, and a data storage device 618, which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 that may communicate with a network 620. The computing device 600 also may include a video display unit 610, e.g., a liquid crystal display (LCD) or a cathode ray tube (CRT), an alphanumeric input device 612, e.g., a keyboard, a cursor control device 614, e.g., a mouse, and an acoustic signal generation device 616, e.g., a speaker. In one embodiment, video display unit 610, alphanumeric input device 612, and cursor control device 614 may be combined into a single component or device, e.g., an LCD touch screen.

Data storage device 618 may include a computer-readable storage medium 628 on which may be stored one or more sets of instructions 625 that may include instructions for a test flakiness system 108 for carrying out the operations described herein, in accordance with one or more aspects of the present disclosure. The test flakiness system 108 may correspond to the test flakiness system 108 of FIG. 1. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media, e.g., a centralized or distributed database and/or associated caches and servers, that store the one or more sets of instructions. The term "computer-readable storage medium" shall also be taken to include any medium capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "retrieving," "performing," "determining," "comparing," "updating," "sending," or the like, refer to actions and processes performed or implemented by computing devices that manipulate and transform data, represented as physical (electronic) quantities within the computing device's registers and memories, into other data similarly represented as physical quantities within the computing device memories or registers or other such information storage, transmission, or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to a particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, and do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times, or the described operations may be distributed in a system that allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure, e.g., circuitry, that performs the task or tasks during operation. As such, the unit/circuit/component can be said to be configured to perform the task, or configurable to perform the task, even when the specified unit/circuit/component is not currently operational, e.g., is not on. The units/circuits/components used with the "configured to" or "configurable to" language include hardware, e.g., circuits, memory storing program instructions executable to implement the operation, etc. Reciting that a unit/circuit/component is "configured to" perform one or more tasks, or is "configurable to" perform one or more tasks, is expressly intended to not invoke 35 U.S.C. 112, sixth paragraph, for that unit/circuit/component. Additionally, "configured to" or "configurable to" can include generic structure, e.g., generic circuitry, that is manipulated by software and/or firmware, e.g., an FPGA or a general-purpose processor executing software, to operate in a manner that is capable of performing the task(s) at issue. "Configured to" may also include adapting a manufacturing process, e.g., a semiconductor fabrication facility, to fabricate devices, e.g., integrated circuits, that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
retrieving, from a repository, a software test and a software module;
executing the software test against the software module a first number of times, observing a first number of failures, to obtain a first flakiness value;
executing the software test against the software module a second number of times, observing a second number of failures, to obtain a second flakiness value;
in response to a convergence criterion between the first flakiness value and the second flakiness value not being met, executing the software test against the software module a third number of times, observing a third flakiness value; and
in response to a difference between one of the first flakiness value, the second flakiness value, or the third flakiness value and a set of historical flakiness values exceeding a threshold, creating a defect record.

2. The method of claim 1, wherein the executing the software test is responsive to a change in the software module.

3. The method of claim 1, wherein the threshold is at least 0.001.

4. The method of claim 1, wherein the executing the software test further comprises a frequency of executing the software test between 5 and 30 days.

5. The method of claim 1, wherein at least one of the first flakiness value, the second flakiness value, or the third flakiness value are determined using at least one of:
the convergence criterion;
a Student's t-test; or
an error propagation.

6. The method of claim 5, wherein the error propagation comprises a standard deviation and a stopping criterion.

7. The method of claim 1, wherein the executing the software test further comprises executing the software test a fourth number of times, periodically, at a first frequency interval.

8. The method of claim 1, further comprising reverting to a previous version of the software module.

9. A system, comprising:
a memory; and
a processing device, operatively coupled to the memory, is configured to:
retrieve, from a repository, a software test and a software module;
execute the software test against the software module a first number of times, observing a first number of failures, to obtain a first flakiness value;

execute the software test against the software module a second number of times, observing a second number of failures, to obtain a second flakiness value;

in response to a convergence criterion between the first flakiness value and the second flakiness value not being met, execute the software test against the software module a third number of times, observe a third flakiness value; and in response to a difference between one of the first flakiness value, the second flakiness value, or the third flakiness value and a set of historical flakiness values exceeding a threshold, create a defect record.

10. The system of claim 9, the processing device further to update the set of historical flakiness values with at least one of the first flakiness value, the second flakiness value, or the third flakiness value.

11. The system of claim 9, the processing device further to execute the software test in response to a change in the software module.

12. The system of claim 11, the processing device further to back out the change in the software module in response to the difference between at least one of the first flakiness value, the second flakiness value, or the third flakiness value and the set of historical flakiness values exceeding the threshold.

13. The system of claim 9, wherein the executing the software test further comprises:

executing the software test the first number of times, periodically, at a first frequency interval, to obtain the first flakiness value; and executing the software test the second number of times, periodically, at a second frequency interval, the second frequency interval less than the first frequency interval, to obtain the second flakiness value.

14. The system of claim 13, wherein on a condition that the second flakiness value exceeds the first flakiness value by a second threshold, create the defect record.

15. A non-transitory computer-readable storage medium including instructions that, when executed by a processing device, cause the processing device to:

retrieve, from a repository, a software test and a software module;

execute the software test against the software module a first number of times, observing a first number of failures, to obtain a first flakiness value;

execute the software test against the software module a second number of times, observing a second number of failures, to obtain a second flakiness value;

in response to a convergence criterion between the first flakiness value and the second flakiness value not being met, executing the software test against the software module a third number of times, observe a third flakiness value; and in response to a difference between one of the first flakiness value, the second flakiness value, or the third flakiness value and a set of historical flakiness values exceeding a threshold, create a defect record.

16. The non-transitory computer-readable storage medium of claim 15, wherein the threshold is at least 0.001.

17. The non-transitory computer-readable storage medium of claim 15, wherein the instructions further cause the processing device to update the set of historical flakiness values with at least one of the first flakiness value, the second flakiness value, or the third flakiness value.

\* \* \* \* \*

UNITED STATES PATENT AND TRADEMARK OFFICE
CERTIFICATE OF CORRECTION

| | |
|---|---|
| PATENT NO. | : 12,141,053 B2 |
| APPLICATION NO. | : 17/992799 |
| DATED | : November 12, 2024 |
| INVENTOR(S) | : Alexander Rukletsov et al. |

It is certified that error appears in the above-identified patent and that said Letters Patent is hereby corrected as shown below:

In the Specification

In Column 5, Line 33, please replace "flakiness of" with -- flakiness $p$ of --.

In Column 5, Line 53, please replace "$| p'_n - p'_{n+m} | \varepsilon$" with -- $| p'_n - p'_{n+m} | < \varepsilon$ --.

In Column 6, Line 1, please replace "(F)" with -- ($\varepsilon$) --.

In Column 6, Line 17, please replace "a," with -- $\sigma$, --.

In Column 6, Line 30, please replace "$(v^2/n)$" with -- $(v^2/n^2)$ --.

In Column 6, Line 30, please replace "$(\sigma n/n)^2$," with -- $(\sigma n/n)^2$, --.

In Column 6, Line 38, please replace "Ho" with -- $H_\emptyset$ --.

In Column 6, Line 40, please replace "HA" with -- $H_A$ --.

In Column 6, Line 55, please replace "HØ" with -- $H_\emptyset$ --.

In Column 8, Line 38, please replace "2λ" with -- 2x --.

Signed and Sealed this
Third Day of June, 2025

Coke Morgan Stewart
*Acting Director of the United States Patent and Trademark Office*